United States Patent
Williams et al.

(10) Patent No.: US 12,284,163 B2
(45) Date of Patent: Apr. 22, 2025

(54) REMOTE DEBUGGING FOR THE INTERNET OF THINGS

(71) Applicant: KORE Wireless Group, Inc., Atlanta, GA (US)

(72) Inventors: Jonathan Williams, Cambridge (GB); Hugo Fiennes, Palo Alto, CA (US); Tejas Patil, Cambridge (GB); Joseph Birr-Pixton, Cambridge (GB)

(73) Assignee: KORE Wireless Group, Inc., Atlanta, GA (US)

( * ) Notice: Subject to any disclaimer, the term of this patent is extended or adjusted under 35 U.S.C. 154(b) by 415 days.

(21) Appl. No.: 17/662,726

(22) Filed: May 10, 2022

(65) Prior Publication Data

US 2023/0254294 A1 Aug. 10, 2023

Related U.S. Application Data

(60) Provisional application No. 63/267,562, filed on Feb. 4, 2022.

(51) Int. Cl.
*H04L 9/40* (2022.01)
*G06F 11/36* (2006.01)
*G16Y 30/10* (2020.01)

(52) U.S. Cl.
CPC ...... *H04L 63/0435* (2013.01); *G06F 11/3664* (2013.01); *G16Y 30/10* (2020.01); *H04L 63/0464* (2013.01)

(58) Field of Classification Search
USPC .......................................................... 713/168
See application file for complete search history.

(56) References Cited

U.S. PATENT DOCUMENTS

| | | | |
|---|---|---|---|
| 2003/0235308 A1* | 12/2003 | Boynton | H04L 63/08 380/270 |
| 2015/0309916 A1* | 10/2015 | Chen | G06F 11/3624 717/125 |
| 2019/0227908 A1* | 7/2019 | Munafo | G06F 11/0748 |
| 2022/0407695 A1* | 12/2022 | Shim | G06F 21/602 |

\* cited by examiner

*Primary Examiner* — Atta Khan
(74) *Attorney, Agent, or Firm* — Schwegman Lundberg & Woessner, P.A.

(57) ABSTRACT

An Internet of Things (IoT) device is deployed with embedded software. A debug client device stores an end-to-end encryption key that corresponds to an end-to-end encryption key stored on the IoT device. The debug client encrypts a debug instruction using the end-to-end encryption key and encrypts additional data using a point-to-point encryption key. The encrypted debug instruction and the encrypted additional data are sent to a debug server over a network. The debug server decrypts the additional data and identifies the IoT device from among multiple IoT devices. The debug server generates a message to the IoT device including the encrypted debug instruction, encrypts the message, and transmits the message to the IoT device. The IoT device decrypts the message using a first decryption key associated with the debug server, retrieves the encrypted message payload, and decrypts the message payload using the stored end-to-end encryption key.

20 Claims, 12 Drawing Sheets

| IOT DEVICE TABLE ||
| --- | --- |
| ACCOUNT | DEVICE ID |
| 1 | 1 |
| 1 | 2 |
| 2 | 3 |
| 2 | 4 |

*FIG. 5*

REMOTE DEBUGGING FOR THE INTERNET OF THINGS

PRIORITY CLAIM

This application claims the benefit of priority to U.S. Provisional Patent Application Ser. No. 63/267,562, filed Feb. 4, 2022, and titled "REMOTE DEBUGGING FOR THE INTERNET OF THINGS," which application is incorporated herein by reference in its entirety.

TECHNICAL FIELD

An embodiment of the present subject matter relates generally to the Internet of Things (IoT) and, more specifically, to remote debugging for the IoT.

BACKGROUND

Software running on an IoT device is debugged using a local Joint Test Action Group (JTAG) interface. The JTAG interface to the software may be disabled before the device is released. With the JTAG interface disabled, the software is no longer amenable to debugging. Alternatively, the JTAG interface may be left enabled, but this allows an attacker with physical access to the device to access and modify the software.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5 is a block diagram of an example database schema, suitable for selecting use by a debug server to facilitate remote debugging of an IoT device.

DETAILED DESCRIPTION

Figure 1:
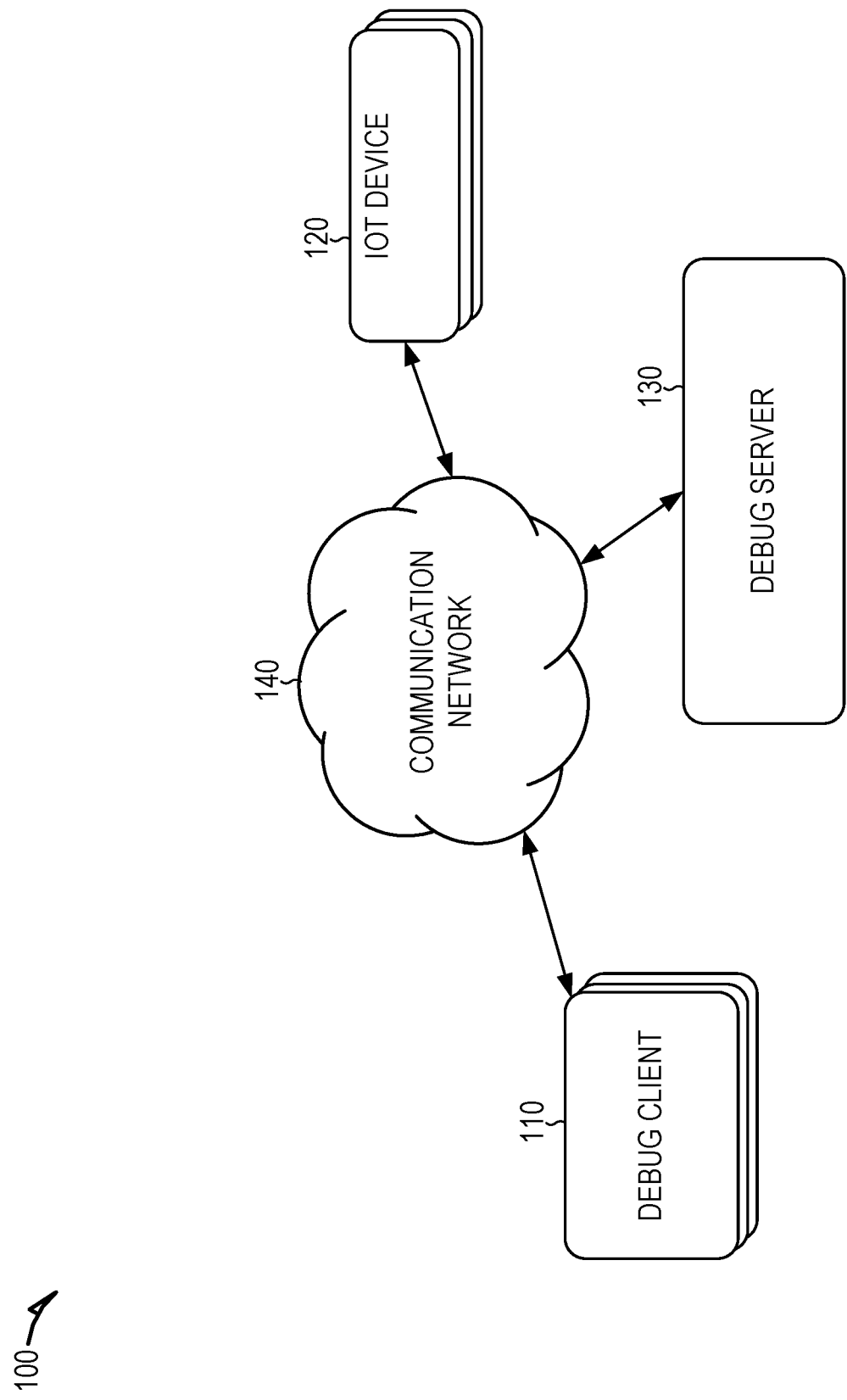
FIG. 1 shows an example network environment for remote debugging for the IoT, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations. Furthermore, well-known features may be omitted or simplified in order not to obscure the described embodiments. Various examples may be given throughout this description. These are merely descriptions of specific embodiments. The scope or meaning of the claims is not limited to the examples given.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" in various places throughout the specification are not necessarily all referring to the same embodiment.

An IoT device is deployed with embedded software. To prevent tampering and reverse engineering, the user of the IoT device is prevented from accessing the internal components of the software. For example, a JTAG interface of the IoT device may be disabled, memory may be encrypted, installation of additional software may be prohibited by the embedded operating system, or any suitable combination thereof. The embedded software may comprise one or more public encryption keys, one or more private encryption keys, one or more symmetrical encryption keys, or any suitable combination thereof.

A debug client device stores a copy of the embedded software. The copy of the embedded software on the debug client device includes debug information. The embedded software on the IoT device may not include the debug information. For example, variable names used in source code may be included in the debug information and removed from the embedded software on the IoT device. Use of the variable names makes it easier for a developer to determine which areas of memory are of interest. Similarly, a relationship between compiled instructions and file names and line numbers of the corresponding source code may be included in the debug information and stripped from the copy of the embedded software on the IoT device.

The debug client device may also store a private encryption key that corresponds to a public encryption key stored on the IoT device. Thus, data encrypted or signed by the debug client can be decrypted or verified by the IoT device with assurance that the data was sent by the debug client device.

A debug server intermediates communication between the debug client device and the IoT device. In some example embodiments, the IoT device creates an outbound connection to the debug server. Typically, firewalls more aggressively guard against inbound connections than outbound connections. However, once the connection is made, the channel is bidirectional.

The debug client encrypts a debug instruction using an end-to-end encryption key, generating an end-to-end encrypted message payload. The message, including the encrypted message payload, is encrypted using point-to-point encryption, and sent to the debug server over a network.

The debug server decrypts the received message and identifies, based on the decrypted message, the IoT device from among multiple IoT devices. The debug server generates a message to the IoT device including the encrypted message payload, encrypts the message, and transmits the message to the IoT device.

The IoT device decrypts the message using a first decryption key associated with the debug server, retrieves the encrypted message payload, and decrypts the message payload using a second decryption key associated with the debug client. Based on the decrypted message payload, the IoT device performs one or more debug operations. Debug operations are operations that manipulate execution of an application or access memory of the application outside of the execution of the application itself. Example debug operations include setting breakpoints, accessing memory by address, accessing memory by variable name, single-stepping execution, setting an instruction pointer, modifying register values, modifying memory values, and the like.

Thus, by use of the systems and methods described herein, an IoT device is accessible for remote debugging only by a debug client using a predetermined encryption key. This allows a developer of software for IoT devices to debug the devices after deployment, which may enable replication of errors that are difficult or impossible to reproduce in the development environment.

FIG. 1 shows an example network environment 100 for remote debugging for the IoT, according to some example embodiments. As shown, multiple devices (i.e., debug clients 110, IoT devices 120, and a debug server 130) are connected to a communication network 140 and configured to communicate with each other through use of the communication network 140. The communication network 140 is any type of network, including a local area network (LAN), such as an intranet; a wide area network (WAN), such as the Internet; a telephone and mobile device network, such as a cellular network; or any combination thereof. Further, the communication network 140 may be a public network, a private network, or a combination thereof. The communication network 140 is implemented using any number of communication links associated with one or more service providers, including one or more wired communication links, one or more wireless communication links, or any combination thereof. Additionally, the communication network 140 is configured to support the transmission of data formatted using any number of protocols.

Multiple computing devices can be connected to the communication network 140. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1200 shown in FIG. 12.

To facilitate communication with other computing devices, a computing device includes a communication interface configured to receive a communication, such as a request, data, and the like, from another computing device in network communication with the computing device and passes the communication along to an appropriate module running on the computing device. The communication interface also sends a communication to another computing device in network communication with the computing device.

In the network environment 100, a user of a debug client 110 debugs software running on an IoT device 120. The debug client 110 and the IoT device 120 communicate via the network 140 with the debug server 130, which intermediates the communication. The communications between the debug client 110 and the debug server 130, as well as the communications between the IoT device 120 and the debug server 130, may be encrypted using a point-to-point encryption protocol. Data communicated between the debug client 110 and the IoT device 120 may be encrypted using an end-to-end encryption protocol.

One skilled in the art would appreciate that the network environment 100 can include any number of debug clients 110, IoT devices 120, and/or debug servers 130. Further, each debug server 130 may concurrently accept communications from and initiate communication messages and/or interact with any number of debug clients 110 and IoT devices 120, and support connections from a variety of different types of debug clients 110, such as desktop computers; mobile computers; mobile communications devices, e.g., mobile phones, smart phones, tablets; smart televisions; set-top boxes (STBs); and/or any other network enabled computing devices. Hence, the debug clients 110 may be of varying type, capabilities, operating systems, and so forth. Similarly, the IoT devices 120 may be devices of varying types such as smart appliances, sensors, smart fire alarms, smart door locks, medical sensors, security systems, fitness trackers, and the like.

A user interacts with a debug server 130 via a client-side application installed on the debug client 110. In some embodiments, the client-side application includes a component specific to the debug server 130. For example, the component may be a stand-alone application, one or more application plug-ins, and/or a browser extension. However, the users may also interact with the debug server 130 via a third-party application, such as a web browser or messaging application, that resides on the debug client 110 and is configured to communicate with the debug server 130. In either case, the client-side application presents a user interface (UI) for the user to interact with the debug server 130. For example, the user interacts with the debug server 130 via a client-side application integrated with the file system or via a webpage displayed using a web browser application.

The debug server 130 provides a channel by which the debug client 110 can debug embedded software running on the IoT device 120. The debug client 110 stores a copy of the software being debugged, the copy including debug information such as source code line numbers and variable names. The IoT device 120 stores a copy of the software being debugged, which may not include the debug information. The IoT device 120 connects to the debug server 130. The connection with the debug server 130 serves multiple purposes. For example, sensor data may be reported by the IoT device 120 to the debug server 130 to provide a web application that monitors the status of the IoT device 120. Additionally, debug commands and data may be sent between the debug server 130 and the IoT device 120.

Debug commands may be sent from the debug client 110 to the debug server 130. In response, the debug server 130 provides the debug commands to the IoT device 120. In response, the IoT device 120 may provide debug data (e.g., application status information, data read from memory, and the like) to the debug server 130 and the debug server 130 sends the debug data to the debug client 110.

By using the debug server 130 to intermediate the communications between the debug client 110 and the IoT device 120, with the IoT device 120 using a single channel to communicate with the debug server 130 for both application data and debug data, no additional channel is used to communicate debug commands and debug data. Thus, if the IoT device 120 is behind a firewall, no additional ports need to be opened to allow the debug connection. By comparison with debug connections that use an incoming connection from the debug client 110 to the IoT device 120, this simplifies the setup for a user of the IoT device 120 and increases the likelihood of the debug connection being successfully established.

Figure 2:
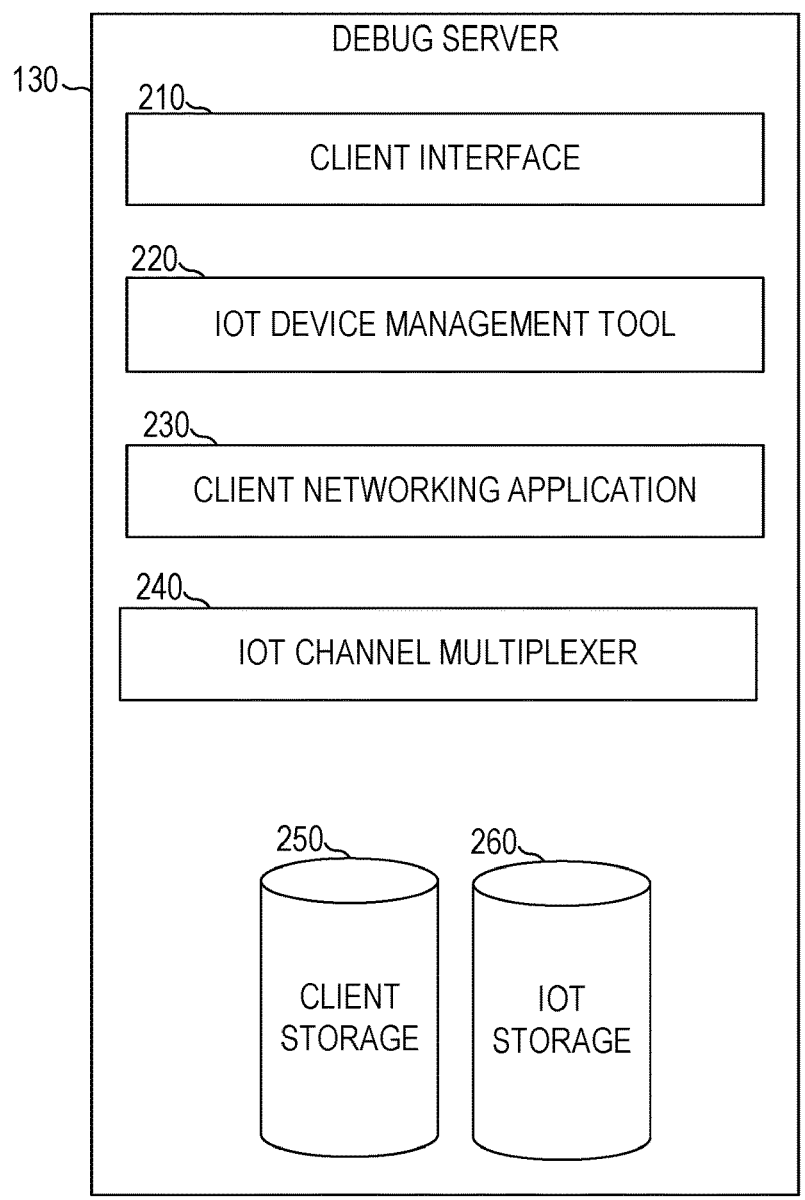
FIG. 2 is a system diagram of a debug server, according to some example embodiments.

FIG. 2 is a system diagram of a debug server 130, according to some example embodiments. As shown, the debug server 130 includes a client interface module 210, an IoT device management tool 220, a client networking application 230, an IoT channel multiplexer module 240, a client storage 250, and an IoT storage 260. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the debug server 130 to facilitate additional functionality that is not specifically described herein. Furthermore, the various functional modules depicted in FIG. 2 may reside on a single computing device or may be distributed across several computing devices in various arrangements such as those used in cloud-based architectures.

The client interface module 210 provides an interface that enables a user of the debug client 110 to select an IoT device 120 for debugging, to send debug commands to the selected IoT device 120, to receive debug data from the IoT device 120, or any suitable combination thereof. The client storage 250 stores data related to the debug clients 110, where it may be accessed by other modules of the debug server 130. For example, a different point-to-point encryption key may be stored for each debug client 110. The client data stored in the client storage 250 may be associated with data identifying the debug client 110, a customer associated with the debug client 110, or both. For example, the point-to-point encryption key may be associated with a unique identifier allocated to the debug client 110 and/or an account of the customer with the debug server 130.

The IoT device management tool 220 may provide a user interface to view data captured by the IoT devices 120 (e.g., to view video captured by a security camera, to view heart rate data captured by a fitness tracker, and the like). The IoT device management tool 220 may send debug commands to the IoT devices 120, receive debug data from the IoT devices 120, or both. The IoT storage 260 stores data related to the IoT devices 120, where it may be accessed by other modules of the debug server 130. For example, a different point-to-point encryption key may be stored for each of the IoT devices 120. The IoT data stored in the IoT storage 260 may be associated with data identifying the IoT device 120, a customer associated with the IoT device 120, or both. For example, the point-to-point encryption key may be associated with a unique identifier allocated to the IoT device 120 and/or an account of the customer with the debug server 130.

Figure 4:
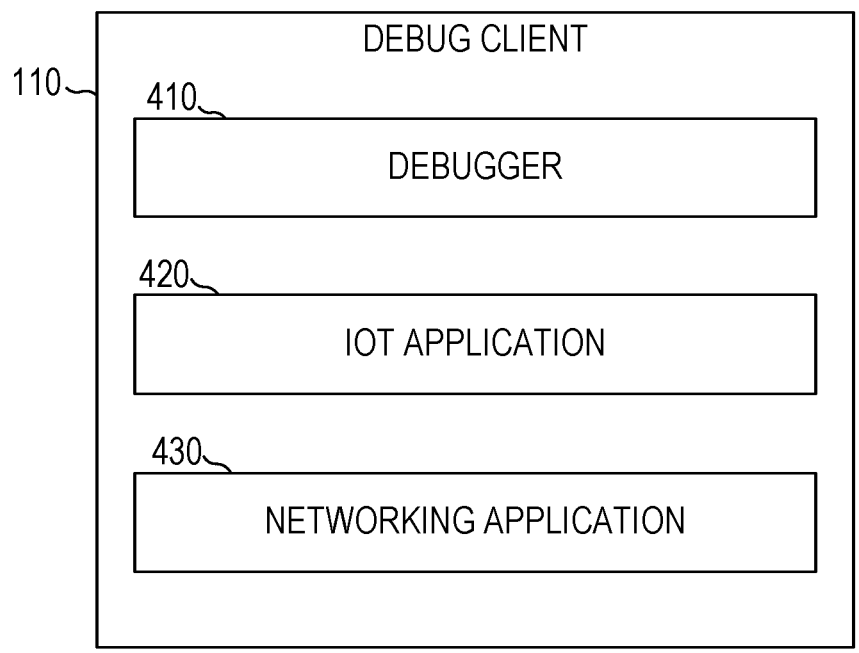
FIG. 4 is a system diagram of a debug client, according to some example embodiments.

The client networking application 230 communicates with the networking application 430 of FIG. 4 to establish a secure channel with the debug client 110. Using the secure channel, the debug client 110 provides debug commands to the debug server 130 for provision to the IoT device 120. Data from the IoT device 120 responsive to the debug commands is also provided to the debug client 110 using the secure channel. The client networking application 230 may use point-to-point encryption to secure the communications with the debug client 110, preventing a third party that intercepts the communications from accessing the debug commands or data.

The IoT channel multiplexer module 240 multiplexes multiple communication streams over a single communication channel between the debug server 130 and an IoT device 120. Thus, an application communication stream and a debug communication stream can be in use simultaneously over a single communication connection. The application communication stream is a communication with an application programming interface (API) provided by the application. For example, a heart rate monitor may be turned on or off and heart rate data may be reported. The debug communication stream is a communication with a debugger that debugs the application (e.g., the debugger 410 of FIG. 4). For example, a breakpoint may be set so that the application stops when a particular instruction is accessed and the debugger may report that the application has been stopped when the event occurs.

Figure 3:
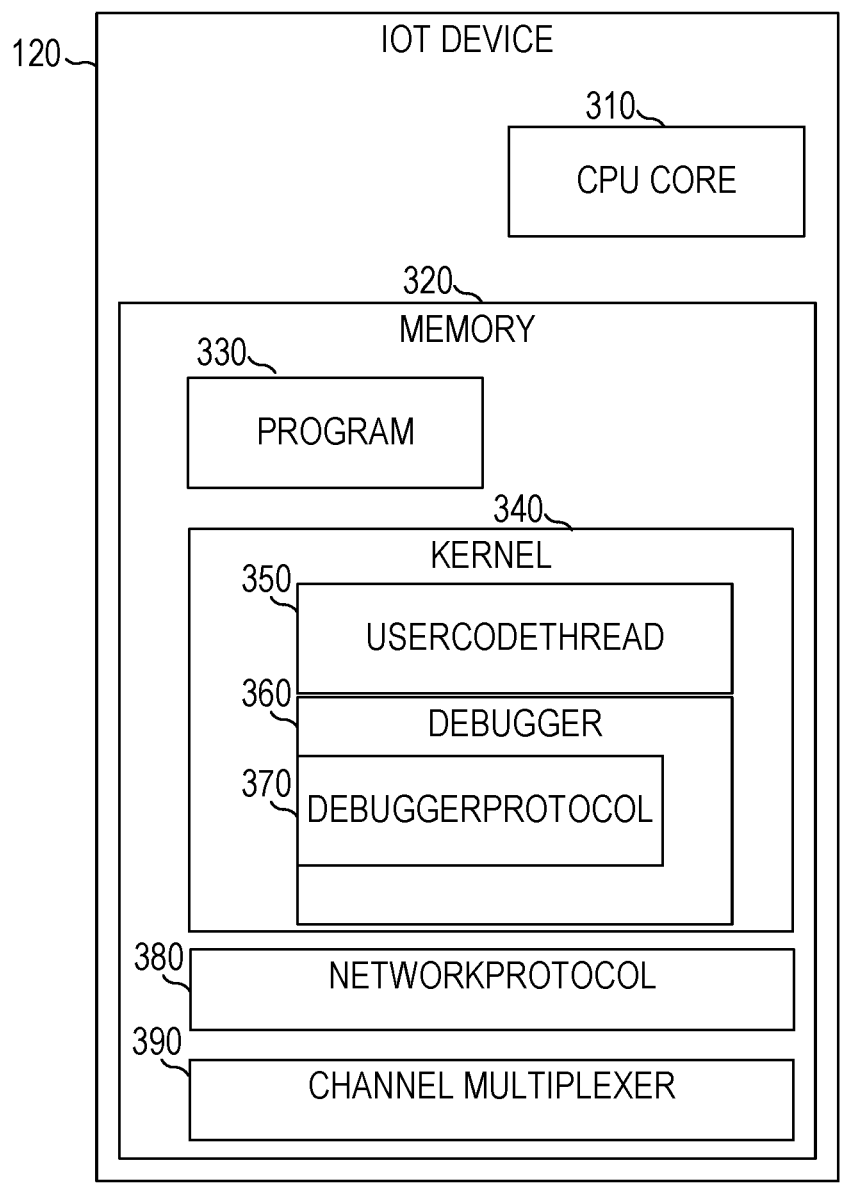
FIG. 3 is a system diagram of an IoT device, according to some example embodiments.

FIG. 3 is a system diagram of an IoT device 120, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the IoT device 120 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the IoT device 120 includes a Central Processing Unit (CPU) core 310 and memory 320. The memory 320 stores a program 330, a kernel 340, a network protocol 380, and a channel multiplexer 390. The IoT device 120 separates the memory into "secure" and "non-secure" partitions. The kernel 340 is the secure partition. Executable code and data outside of the kernel 340 is in the non-secure partition. Within the kernel 340 are a UserCodeThread 350 and a debugger 360. The debugger 360 comprises a debugger protocol 370. One example embodiment of a secure/non-secure divide would be the use of ARM® TrustZone® technology The CPU core 310 of the IoT device 120 executes the program 330. Output from the program 330 is sent to the debug server 130 using the network protocol 380. The channel multiplexer 390 may modify the outgoing packets to indicate a virtual channel for the output packets (e.g., by indicating that the packets contain application data).

When the program 330 is being debugged, the UserCodeThread 350 interacts with the program 330 to control execution (e.g., to implement breakpoints, control single-stepping, modify memory contents, and the like). The channel multiplexer 390 multiplexes debug and application data streams over a single network connection. Thus, communications for the program 330 are provided to the program 330 and communications for the debugger 360 are provided to the debugger protocol 370 component of the debugger 360. The debugger protocol 370 interprets the received packets and provides corresponding instructions to the UserCodeThread 350 or the CPU core 310.

The network protocol 380 or the channel multiplexer 390 may encrypt outgoing data packets using point-to-point encryption, decrypt incoming packets using point-to-point encryption, or both. The debugger protocol 370 may encrypt outgoing debug data using end-to-end encryption, decrypt incoming debug packets using end-to-end encryption, or both.

The debugger protocol 370 may decrypt a payload of a received communication using an end-to-end decryption key (e.g., a public key corresponding to a private key used by the debug client 110, a unique key for the debug session, or any suitable combination thereof). Based on the decrypted payload, the debugger 360 performs a debugging operation on the program 330 running on the IoT device 120. For example, the decrypted payload may be of the form shown below. In this example, a binary JavaScript Object Notation (B SON) object is used to encapsulate the debug request.

```
{
    command: "debugcmd",
    data: binary(req)
}
```

The debugger protocol 370 provides the debug command (indicated as "req" in the example above) to the debugger 360. In response, the debugger 360 performs the debugging operation indicated by the debug command. For example, a breakpoint may be set at a memory address indicated in the debug command.

FIG. 4 is a system diagram of a debug client 110, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the debug client 110 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the debug client 110 includes a debugger 410, a copy of an IoT application 420 being debugged, and a networking application 430. For simplicity, the system diagram of FIG. 4 shows software components and not the hardware processors used to execute the software components, the hardware memory storing the software components, the hardware network adapters that transmit and receive data used by the software components, and so on.

The debugger 410 (e.g., gdb) accesses the copy of the IoT application 420 to determine a relationship between source code elements (e.g., file names and line numbers, variable names, object definitions, and the like) and data in memory (e.g., instructions, data on the stack, data in the heap, data in processor registers, and the like). The debugger 410 provides a user interface to a user of the debug client 110, allowing the user to set breakpoints, control execution, and access data stored in memory.

When debugging an application executing locally, the debugger 410 retrieves data by accessing local memory, sets breakpoints using local processor instructions, and performs other debug operations locally. When debugging the program 330 of the IoT device 120 via the network 140, the commands generated by the debugger 410 are encapsulated into packets and sent over the network 140 to the debugger 360 for local processing. For security, the commands are encrypted by the networking application 430 before being sent on the network 140. Likewise, when the debugger 360 generates events (e.g., a triggering of a breakpoint) or data (e.g., data read from memory of the IoT device 120 in response to a read command received from the debugger 410), a responsive data packet is sent over the network 140 by the IoT device 120, decrypted by the networking application 430, and processed by the debugger 410.

The networking application 430 may support end-to-end encryption. For example, the debugger 360 may have been provisioned on the IoT device 120 with a public key corresponding to a private key of the debug client 110. By encrypting debug commands for the IoT device 120 using the private key, the IoT device 120 is able to confirm that the debug commands were sent by the debug client 110. Any debug commands that cannot be successfully decrypted using the public key are rejected. Thus, unauthorized devices (e.g., attackers) will be unable to send debug commands to the IoT device 120.

The responsive packets may be encrypted by the IoT device 120 using a private key of the IoT device 120. The private key may be unique to an individual IoT device 120 or common among a set of IoT devices 120 (e.g., common to all devices of a particular model or revision number but different between models or revisions). The networking application 430 may select from among multiple public keys to determine the correct public key to decrypt the responsive packets. By using public/private key encryption, the debug client 110 is able to confirm that the data being received originated from the IoT device 120.

Additionally or alternatively, the networking application 430 may support point-to-point encryption. The debug command may be encapsulated in a network data packet sent to the debug server 130. The network data packet sent to the debug server 130 may be encrypted using a point-to-point encryption protocol. Thus, security is achieved both with the communication between the debug client 110 and the debug server 130 and between the debug client 110 and the IoT device 120, even though the communication between the debug client 110 and the IoT device 120 is intermediated by the debug server 130.

The networking application 430 may receive a command from the debugger 410 using a first protocol. For example, the debugger 410 may operate as though the IoT application 420 were executing on the debug client 110 and issue debug commands using a local debugging protocol. The networking application 430 may intercept the command and convert the command to a second protocol, such as a packet-based protocol for communicating with the debug server 130 over the network 140. In some example embodiments, a binary command from the debugger 410 is encapsulated in a BSON object. For example, a debug command may be encapsulated as shown below, where "req" indicates the debug command received from the debugger 410.

```
{
    command: "debugcmd",
    data: binary(req)
}
```

The converted command may be encrypted by the networking application 430 using an end-to-end-encryption key. For example, a private key for the customer associated with the IoT device 120 being debugged may be used to encrypt the converted command, a unique key for the debugging session may be used, or any suitable combination thereof. The networking application 430 may send, to the debug server 130, a communication including a payload comprising the encrypted converted command.

As a further example of the second protocol used to communicate debug commands over the network, each message may start with struct {uint16_t opcode; uint16_t len} (i.e., a 16-bit operation code value followed by a 16-bit length value) and conclude with len bytes of payload (e.g., arguments). A debug command sent from the debug client 110 may cause a particular type of reply to be sent from the IoT device 120 being debugged. The table below shows some example opcodes, their arguments, expected replies, and meanings.

| Opcode | Arguments | Reply | Meaning |
|---|---|---|---|
| Hello (0) | None | None | Sent to the IoT device 120 to commence debugging. The IoT device 120 halts the program 330. |
| Goodbye (1) | None | None | Sent to the IoT device 120 to conclude debugging. The IoT device 120 resumes the program 330. |
| HaltReason (3) | None | HaltReason response (discussed below) | The IoT device 120 reports why it is currently stopped. |
| ReadRegisters (4) | None | 17 32-bit words with core register values | Read all core registers |
| ReadRegister (5) | Byte with register number | 32-bit word with register value | Read one core or special register |
| WriteRegisters (6) | 17 32-bit words with core register values | Empty confirmation | Write all core registers |
| WriteRegister (7) | Byte with register number, 32-bit value to write | Empty confirmation | Write single core or special register |
| ReadMemory (8) | 32-bit address, 16-bit length | Length bytes of data | Read non-secure memory |
| WriteMemory (9) | 32-bit address, variable-length data | Empty confirmation | Write non-secure memory |
| Continue (10) | None | None | Run program 330 until it halts |
| Halt (11) | None | HaltReason response | Stop running the program 330 |
| InsertBreakpoint (12) | 32-bit address | Byte with value 1 on success, 0 on failure | Set up breakpoint |
| RemoveBreakpoint (13) | 32-bit address | Byte with value 1 on success, 0 on failure | Remove breakpoint |

While the program 330 is running, the IoT device 120 may asynchronously send a HaltReason response to the debug client 110 if the program 330 stops. The HaltReason response is encoded is 18 32-bit words: the first is a reason code, the remainder are the 17 core registers. Example reason codes include HardFault, MemFault, BusFault, UsageFault, and SecureFault CPU faults; HaltRequest (caused by receiving a Halt command); and Break (caused by hitting a breakpoint). The networking application 430 may convert the received responses for processing by the debugger 410. For example, CPU faults may be converted into SIGSEGV signals and other faults may be converted into SIGTRAP signals.

The number and sizes of arguments and responses described above may vary from device to device. For example, the response to the ReadRegisters command may be 17 32-bit words when the IoT device 120 comprises 17 32-bit registers. In other devices, more or fewer registers of smaller or larger size may be used, and the response to the ReadRegisters command may vary accordingly.

FIG. 5 is a block diagram of an example database schema 500, suitable for selecting use by the debug server 130 to facilitate remote debugging of an IoT device 120. The database schema 500 includes an IoT device table 510. The IoT device table 510 includes rows 530A, 530B, 530C, and 530D of a format 520.

Each row 530A-530D of the IoT device table 510 stores data for a different IoT device 120. The format 520 shows that the rows 530A-530D store an account identifier and a device identifier for each IoT device 120. Each IoT device 120 has a unique device identifier. The account identifier for an IoT device 120 indicates which account receives data generated by the IoT device 120, is permitted to control the IoT device 120, is permitted to debug software of the IoT device 120, or any suitable combination thereof.

Figure 6:
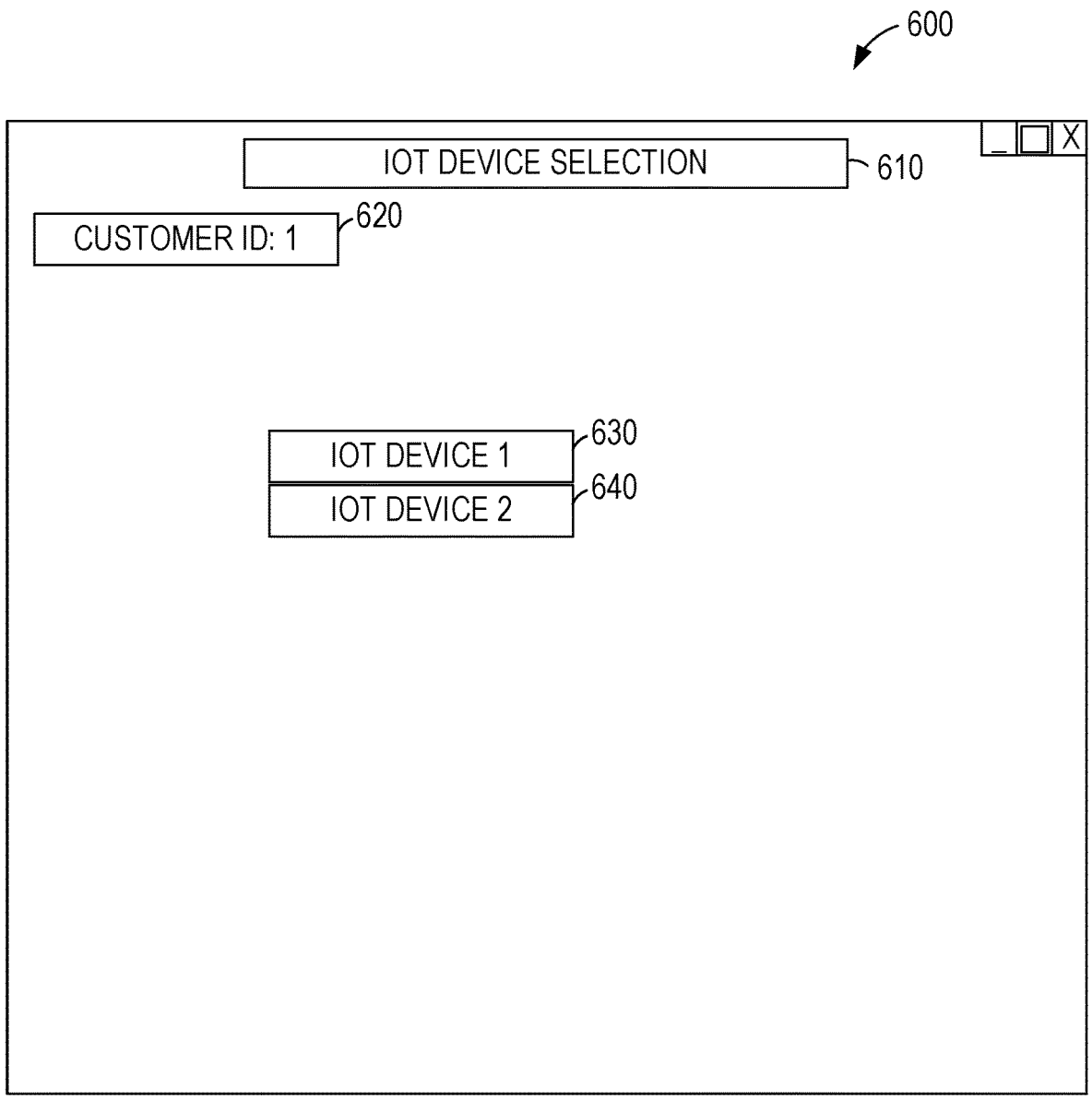
FIG. 6 is an example user interface for receiving a selection of an IoT device to debug, according to some example embodiments.

FIG. 6 is an example user interface 600 for receiving a selection of an IoT device 120 to debug, according to some example embodiments. The user interface 600 includes a title 610, a customer information area 620, and IoT device identifiers 630 and 640. The user interface 600 may be displayed on a display device of a user associated with the customer indicated in the customer information area 620. For example, with reference to FIG. 1, the debug server 130 may cause a web browser running on a debug client 110 associated with customer 1 to display the user interface 600. A selection of one or more of the IoT device identifiers 630-640 may be sent from the debug client 110 to the debug server 130 via the communication network 140 (e.g., the Internet). Thereafter, debug commands may be sent from the debugger 410 to the selected IoT device 120 via the debug server 130.

Prior to presentation of the user interface 600, the debug server 130 may receive incoming communications from the IoT devices indicated by the IoT device identifiers 630-640. Each of the incoming communications may include an identifier of the IoT device sending the communication. Based on the identifiers, an account associated with each IoT device is determined (e.g., using the IoT device table 510). The IoT device identifiers 630-640 are selected for inclusion in the user interface 600 based on the account associated with the IoT device identifiers 630-640 being the account of the debug client 110. Thus, more or fewer IoT device identifiers 630-640 may be shown depending on the number of IoT devices associated with the same customer account. The user interface 600 enables the user of the debug client 110 to select one or more of the IoT devices for debugging.

Figure 7:
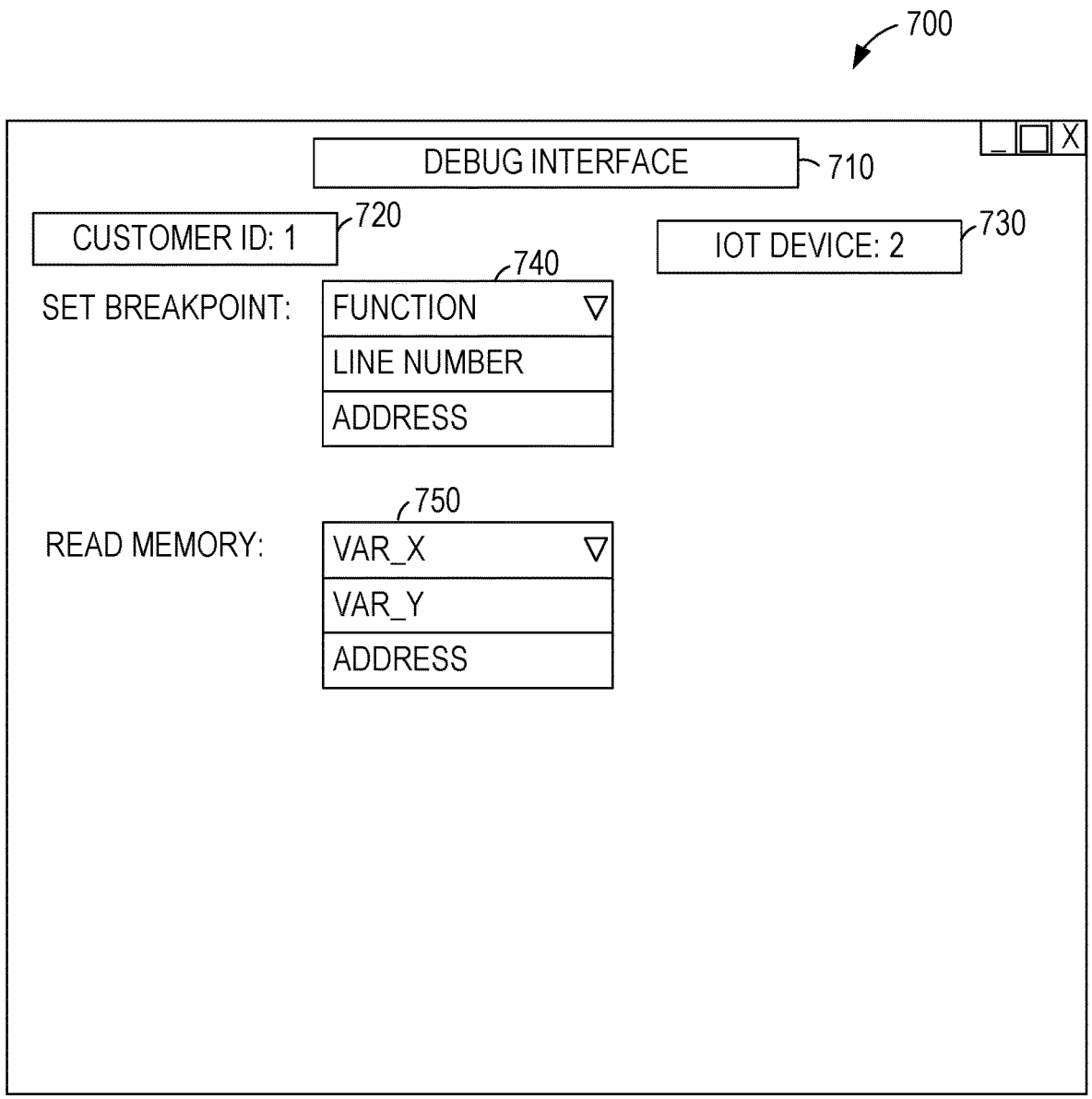
FIG. 7 is an example user interface for receiving debug commands to provide to an IoT device being debugged, according to some example embodiments.

FIG. 7 is an example user interface 700 for receiving debug commands to provide to an IoT device being debugged, according to some example embodiments. The user interface 700 includes a title 710, a customer information area 720, an IoT device information area 730, and debug command selectors 740 and 750. The user interface 700 may be displayed in response to a selection of an IoT device identifier in FIG. 6.

The user interface 700 may be displayed on a display device of a debug client 110 associated with the customer indicated in the customer information area 720. For example, with reference to FIG. 1, the debug server 130 may cause a web browser running on a debug client 110 associated with a customer system to display the user interface 700. Commands selected by user of the user interface 700 may be submitted to the debug server 130 via the communication network 140 (e.g., the Internet). The debug server 130 communicates the commands to the IoT device 120 indicated in the IoT device information area 730 (e.g., the IoT device 120 selected using the user interface 600 of FIG. 6).

The title 710 indicates that the user interface 700 is a debug interface. The customer information area 720 indicates that the IoT device being debugged is associated with the customer with identifier 1. The IoT device information area 730 indicates that the IoT device being debugged has identifier 2.

The debug command selector 740 allows the user to select among multiple options for setting a breakpoint. After selecting the type of breakpoint (e.g., function, line number, or address), the user interface 700 may further prompt the user to select a particular location for the breakpoint (e.g., by entering a function name, line number, or address in a text field; by selecting a function name, line number, or address from a drop-down list; by selecting a function name, line number, or instruction from a text interface that allows selection within text of source code files, or any suitable combination thereof). When the parameters for the breakpoint have been selected, a debug command is sent from the debug client 110 to the debug server 130.

The debug command selector 750 allows the user to select among multiple options for reading memory. As shown in the example of FIG. 7, the debug command selector 750 includes variable names and an address option. In response to selection of the address option, the user may be prompted to enter a memory address in a text field, to select a memory address from a graphical representation of memory, or any suitable combination thereof. When the parameters for the memory read have been selected, a debug command is sent from the debug client 110 to the debug server 130.

The debug command includes an identifier of the IoT device 120 being debugged (e.g., the IoT device 120 indicated in the IoT information area 730). The debug server 130 receives the debug command, validates that the debug client 110 is permitted to send debug clients to the IoT device 120 indicated in the debug command (e.g., using the IoT device table 510), and sends the debug command to the IoT device 120.

Thus, by use of the user interface 600 to select one or more IoT devices to be debugged and use of the user interface 700 to provide one or more debugging commands, a user is enabled to securely send debug messages to IoT devices.

Figure 8:
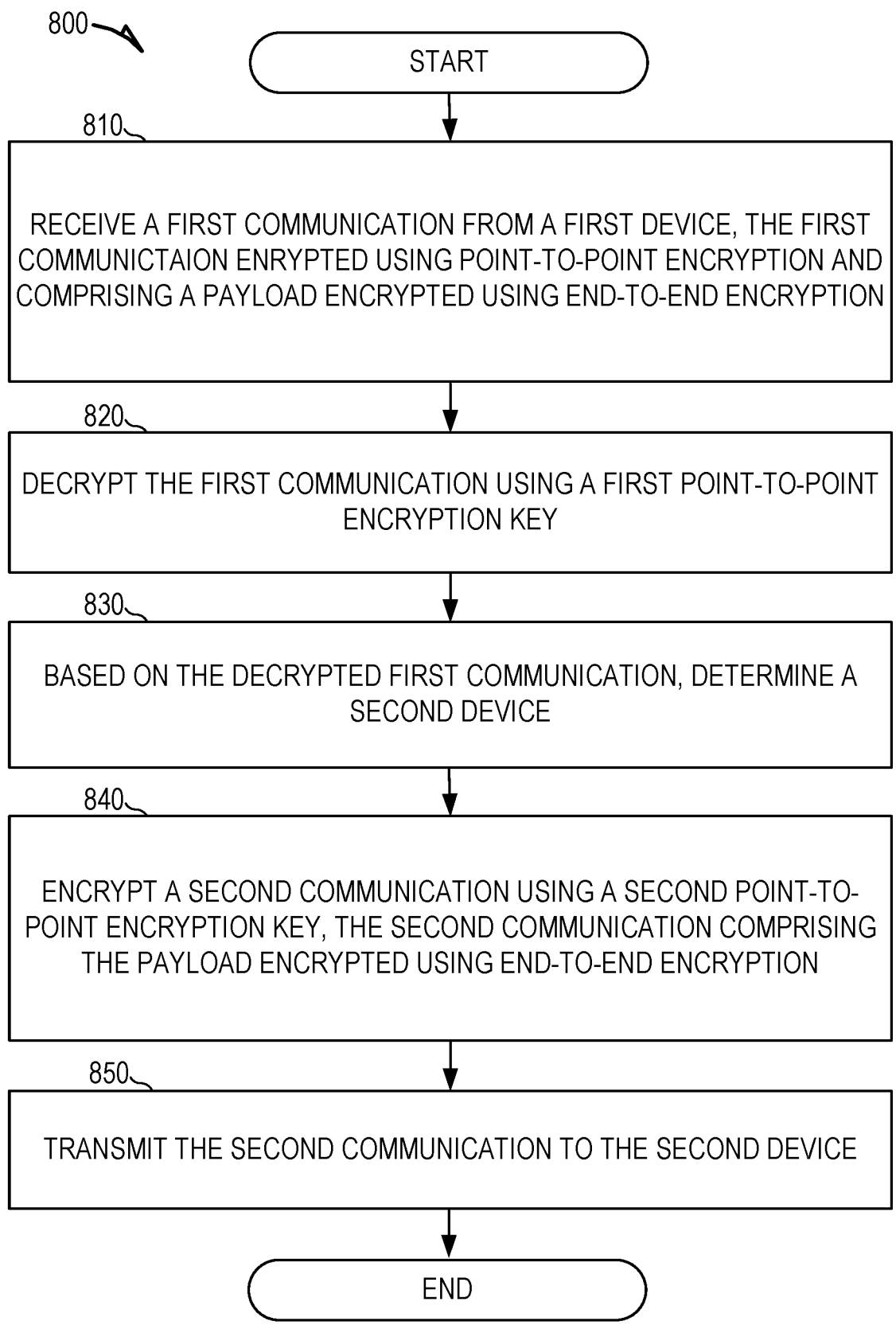
FIG. 8 is a flowchart showing a method for facilitating secure communications between a debug client and an IoT device, according to some example embodiments.

FIG. 8 is a flowchart showing a method 800 for facilitating secure communications between a debug client and an IoT device, according to some example embodiments. The method 800 may be embodied in computer-readable instructions for execution by one or more processors such that the operations of the method 800 may be performed in part or in whole by the debug server 130; accordingly, the method 800 is described below by way of example with reference thereto. However, it shall be appreciated that at least some of the operations of the method 800 may be deployed on various other hardware configurations and the method 800 is not intended to be limited to the debug server 130.

In operation 810, the debug server 130 receives a first communication from a first device (e.g., the debug client 110), the first communication encrypted using point-to-point encryption and comprising a payload encrypted using end-to-end encryption. The first communication may include an unencrypted portion (e.g., data used to route the first communication from the first device to the debug server 130, data used to identify the point-to-point encryption key, or both), a first encrypted portion encrypted using point-to-point encryption, and a second encrypted portion encrypted using end-to-end encryption.

The debug server 130 decrypts the first communication using a first point-to-point encryption key (operation 820). For example, transport layer security (TLS) 1.2 or 1.3 may be used to encrypt the communications between the debug client 110 and the debug server 130. In these protocols, each communicating device generates a new public/private key pair for the communication session. The public keys are exchanged, allowing asymmetric encryption to be used between the devices for the communication session. A symmetric encryption key for the communication session may be generated using either key encipherment or key agreement. In a key encipherment implementation, one device generates a symmetric key. The generated symmetric key is encrypted using the other device's public key and provided to the other device. In a key agreement implementation, each device generates the same key using their own private key and the other device's public key. Since both devices generate the same key, the symmetric key does not need to be transferred over the network.

Based on the decrypted first communication, the debug server 130, in operation 830, determines a second device (e.g., the IoT device 120). For example, the decrypted first portion may include an identifier of the IoT device 120. The IoT device table 510 may be checked to confirm that the customer associated with the debug client 110 is also associated with the IoT device 120. If the IoT device 120 is not associated with the customer, an error message may be sent to the debug client 110 and the method 800 terminated.

In operation 840, the debug server 130 encrypts a second communication using a second point-to-point encryption key. The second communication comprises the payload encrypted using end-to-end encryption. The second communication may include an unencrypted portion (e.g., data used to route the second communication from the debug server 130 to the IoT device 120), a first encrypted portion encrypted using the second point-to-point encryption key, and a second encrypted portion encrypted using end-to-end encryption.

The debug server 130, in operation 850, transmits the second communication to the second device. In some example embodiments, the second communication is sent using a multiplexer that allows multiple communication streams to be sent over a single channel.

The second device decrypts both portions of the second communication and processes a debug command included in the payload sent by the first device. The second device may send an acknowledgement or resulting data from the debug command (e.g., the data stored in memory requested by the debug command). The reverse communication process may be implemented by repeating the method 800, with the "first device" referring to the IoT device 120 and the "second device" referring to the debug client 110. Thus, the method 800 allows the debug server 130 to intermediate bi-directional communication between the debug clients 110 and the IoT devices 120.

Figure 9:
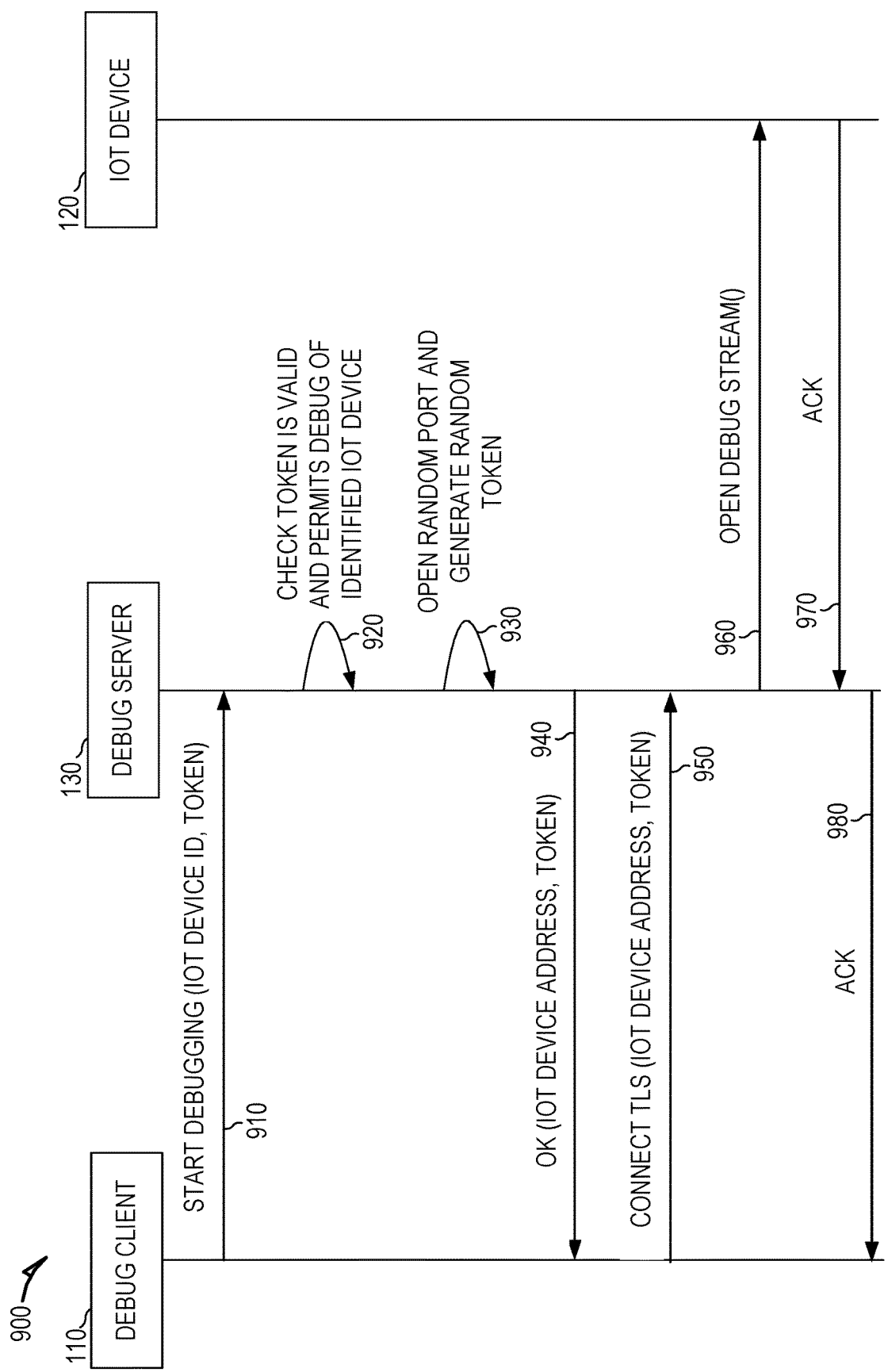
FIG. 9 is a swimlane diagram showing communications among a debug client, a debug server, and an IoT device being debugged, according to some example embodiments.

FIG. 9 is a swimlane diagram 900 showing communications among the debug client 110, the debug server 130, and the IoT device 120 being debugged, according to some example embodiments. The swimlane diagram 900 includes communications 910, 940, 950, 960, 970, and 980; and operations 920 and 930.

The debug client 110 sends the start debugging communication 910 to the debug server 130. The start debugging communication 910 includes an identifier of the IoT device 120 (e.g., a device identifier of one of the rows 530A-530D of the IoT device table 510 of FIG. 5) and a token. The token may be an encrypted or signed data object created by the debug server 130 and provided to the debug client 110. The token may include a customer identifier and timestamp or other unique identifier for the token.

In operation 920, the debug server 130 checks that the token is valid and, based on the validity of the token, permits debugging of the identified IoT device. For example, the debug server 130 may verify that the token was not forged by verifying that it was signed or encrypted using a private key of the debug server 130. The debug server 130 may use a database to track a status for each token that indicates whether the token is valid or not. For example, a customer may purchase a number of tokens for debugging, each of which may be used to start a single debug session. Thus, after a token is used to initiate a debug session, the database is updated to indicate that the token has been used, and future requests using the same token will not be serviced.

The debug server 130, in operation 930, opens a random port to the IoT device 120 and generates a random token for the individual debug session. An address for the IoT device 120 is provided to the debug client 110 in communication 940, along with the random token. The address may include a URL for the IoT device 120 and the random port.

In communication 950, the debug client 110 connects to the debug server 130 using transport layer security (TLS). The communication 940 is to the IoT device address and includes the random token for the communication session. In response to the communication 950, the debug server 130 sends communication 960 to the IoT device 120, opening a debug stream. The communication 960 may be sent over a multiplexed channel. For example, the IoT device 120 may open a channel to the debug server 130 to report data gathered by the program 330. Using the IoT channel multiplexer module 240, the debug server 130 can continue receiving data over the channel while also using the channel to communicate debug commands and responses.

The IoT device 120 acknowledges the opening of the debug stream in ACK communication 970. In response to receiving the ACK communication 970, the debug server 130 confirms with the debug client 110 that the connection to the IoT device 120 was successful (ACK communication 980).

Thus, after the communications and operations of FIG. 9, the debug client 110 has established a debug session with the IoT device 120, intermediated by the debug server 130.

Figure 10:
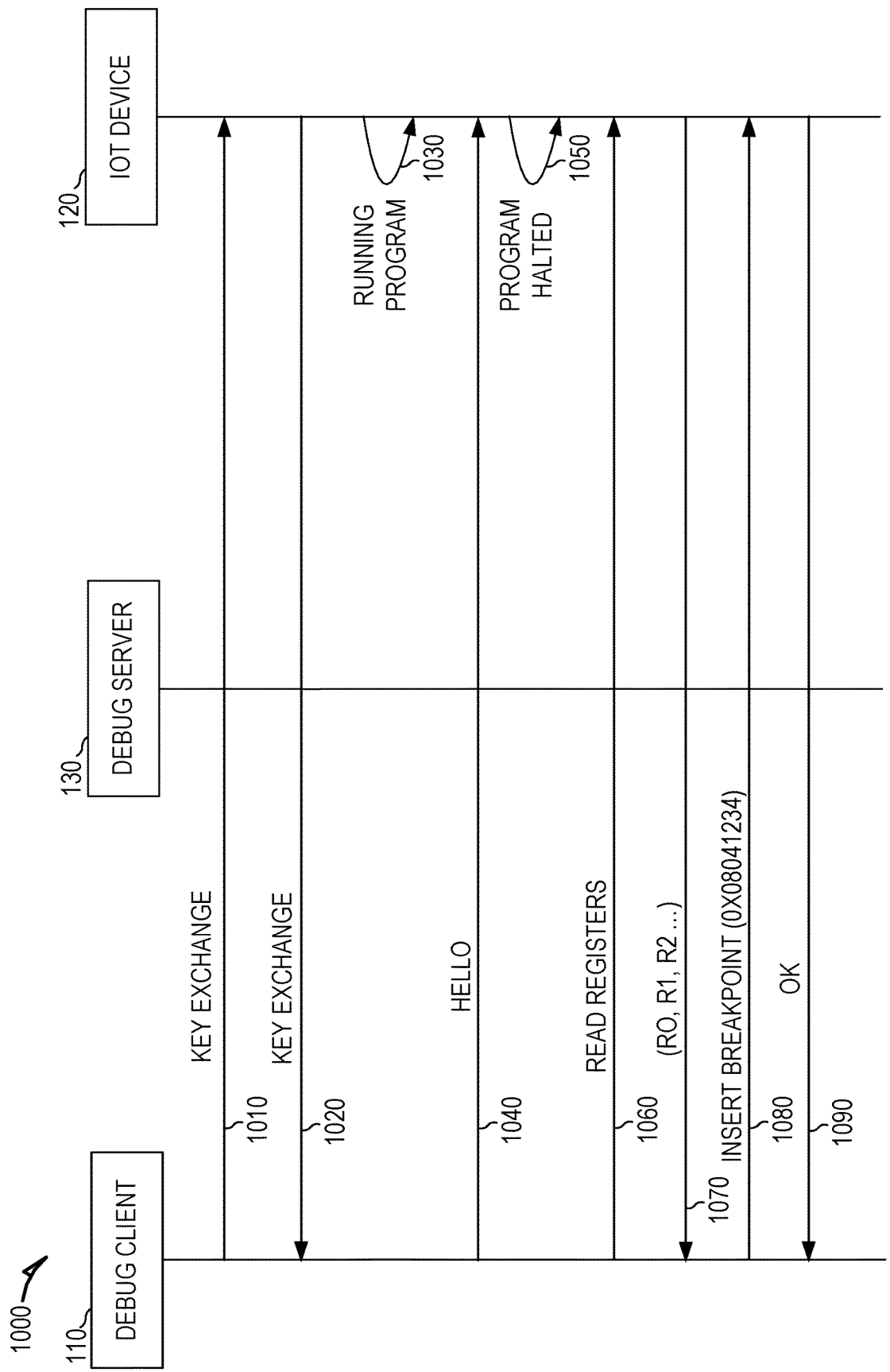
FIG. 10 is a swimlane diagram showing communications among a debug client, a debug server, and an IoT device being debugged, according to some example embodiments.

FIG. 10 is a swimlane diagram 1000 showing communications among the debug client 110, the debug server 130, and the IoT device 120 being debugged, according to some example embodiments. The swimlane diagram 1000 includes communications 1010, 1020, 1040, 1060, 1070, 1080, and 1090; and operations 1030 and 1050. The communications and operations of the swimlane diagram 1000 may be performed after the communications and operations of the swimlane diagram 900.

Communications between the debug client 110 and the IoT device 120 are intermediated by the debug server 130. Thus, the key exchange communication 1010 comprises a first communication from the debug client 110 to the debug server 130 and a second communication 1020 from the debug server 130 to the IoT device 120. This allows the debug communication to make use of the channel opened by the IoT device 120 to the debug server 130 to report data generated by the program 330. If the debug client 110 were to attempt to establish a new communication channel with the IoT device 120, the incoming communication attempt would likely be blocked by a firewall protecting the local network of the IoT device 120.

The communications 1010 and 1020 are key exchange communications. In these communications, the debug client 110 and the IoT device 120 exchange decryption keys to be used to decrypt the communications sent during this debug session. Since each debug session uses different encryption keys, an attacker accessing the keys for a debug session will have a limited opportunity to make use of the keys.

After the keys are exchanged, the debug client 110 sends Hello communication 1040 to the IoT device 120, indicating that a debugging session is being begun. Prior to receipt of the Hello communication 1040, the IoT device 120 was executing the program 330 (shown as operation 1030). In response to receipt of the Hello communication 1040 initiating the debug session, the IoT device 120 halts the program 330 (operation 1050).

After sending the Hello communication 1040, the debug client 110 may begin sending other debug commands. In the example of FIG. 10, the debug client 110 sends the ReadRegisters communication 1060. In response, the IoT device 120 sends the contents of the core registers, in communication 1070.

The debug client 110 continues sending debug commands and receiving responses until the user of the debug client 110 is ready to end the debug session. In the example of FIG. 10, the debug client 110 sends the InsertBreakpoint communication 1080, indicating a memory address at which the IoT device 120 is to halt execution. In communication 1090, the IoT device 120 responds with an OK message, indicating that the breakpoint has been set. When the debug client 110 wishes to end the debug session, a Goodbye message is sent. In response to receiving the Goodbye message, the IoT device 120 clears all breakpoints and resumes execution of the program 330.

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: receiving, via a first network, a first communication from a first device, the first communication encrypted using point-to-point encryption and comprising a payload encrypted using end-to-end encryption; decrypting the first communication using a first point-to-point encryption key; based on the decrypted first communication, determining a second device; encrypting a second communication using a second point-to-point encryption key, the second communication comprising the payload encrypted using end-to-end encryption; and transmitting, via a second network, the second communication to the second device.

In Example 2, the subject matter of Example 1 includes, wherein the payload comprises a debug command for the second device.

In Example 3, the subject matter of Examples 1-2 includes multiplexing, on a single connection to the second device, multiple data streams comprising a first data stream for communication by an application and a second data stream for debugging the application.

In Example 4, the subject matter of Examples 1-3 includes receiving, by the first device, a command from a debugging application using a first protocol; converting, by the first device, the command to a second protocol; and encrypting, by the first device, the converted command using an end-to-end encryption key; wherein the payload of the first communication comprises the encrypted converted command.

In Example 5, the subject matter of Examples 1-4 includes decrypting, by the second device, the payload using an end-to-end decryption key; and based on the decrypted payload, performing a debugging operation on an application running on the second device.

In Example 6, the subject matter of Example 5 includes, wherein the debugging operation comprises setting a breakpoint.

In Example 7, the subject matter of Examples 1-6 includes receiving an incoming communication from the second device, the incoming communication comprising an identifier of the second device; determining, based on the identifier of the second device, an account associated with the second device; and allowing the first device to communicate with the second device based on the account.

In Example 8, the subject matter of Example 7 includes, wherein: the incoming communication is a first incoming communication; the identifier of the second device is a first identifier; and the method further comprises: receiving a second incoming communication from a third device, the second incoming communication comprising a second identifier of the third device; determining, based on the second identifier, that the account is associated with the third device; and causing to be presented a user interface that allows selection of either the second device or the third device for debugging.

Example 9 is a system comprising: one or more computer processors; and one or more computer-readable mediums storing instructions that, when executed by the one or more computer processors, cause the system to perform operations comprising: receiving, via a first network, a first communication from a first device, the first communication encrypted using point-to-point encryption and comprising a payload encrypted using end-to-end encryption; decrypting the first communication using a first point-to-point encryption key; based on the decrypted first communication, determining a second device; encrypting a second communication using a second point-to-point encryption key, the second communication comprising the payload encrypted using end-to-end encryption; and transmitting, via a second network, the second communication to the second device.

In Example 10, the subject matter of Example 9 includes, wherein the payload comprises a debug command for the second device.

In Example 11, the subject matter of Examples 9-10 includes, wherein the operations further comprise: multiplexing, on a single connection to the second device, multiple data streams comprising a first data stream for communication by an application and a second data stream for debugging the application.

In Example 12, the subject matter of Examples 9-11 includes, wherein the operations further comprise: receiving, by the first device, a command from a debugging application using a first protocol; converting, by the first device, the command to a second protocol; and encrypting, by the first device, the converted command using an end-to-end encryption key; wherein the payload of the first communication comprises the encrypted converted command.

In Example 13, the subject matter of Examples 9-12 includes, wherein the operations further comprise: decrypting, by the second device, the payload using an end-to-end decryption key; and based on the decrypted payload, performing a debugging operation on an application running on the second device.

In Example 14, the subject matter of Example 13 includes, wherein the debugging operation comprises setting a breakpoint.

In Example 15, the subject matter of Examples 9-14 includes, wherein the operations further comprise: receiving an incoming communication from the second device, the incoming communication comprising an identifier of the second device; determining, based on the identifier of the second device, an account associated with the second device; and allowing the first device to communicate with the second device based on the account.

In Example 16, the subject matter of Example 15 includes, wherein: the incoming communication is a first incoming communication; the identifier of the second device is a first identifier; and the operations further comprise: receiving a second incoming communication from a third device, the second incoming communication comprising a second identifier of the third device; determining, based on the second identifier, that the account is associated with the third device; and causing to be presented a user interface that allows selection of either the second device or the third device for debugging.

Example 17 is a non-transitory computer-readable medium storing instructions that, when executed by one or more computer processors of one or more computing devices, cause the one or more computing devices to perform operations comprising: receiving, via a first network, a first communication from a first device, the first communication encrypted using point-to-point encryption and comprising a payload encrypted using end-to-end encryption; decrypting the first communication using a first point-to-point encryption key; based on the decrypted first communication, determining a second device; encrypting a second communication using a second point-to-point encryption key, the second communication comprising the payload encrypted using end-to-end encryption; and transmitting, via a second network, the second communication to the second device.

In Example 18, the subject matter of Example 17 includes, wherein the payload comprises a debug command for the second device.

In Example 19, the subject matter of Examples 17-18 includes, wherein the operations further comprise: multiplexing, on a single connection to the second device, multiple data streams comprising a first data stream for communication by an application and a second data stream for debugging the application.

In Example 20, the subject matter of Examples 17-19 includes, wherein the operations further comprise: receiving, by the first device, a command from a debugging application using a first protocol; converting, by the first device, the command to a second protocol; and encrypting, by the first device, the converted command using an end-to-end encryption key; wherein the payload of the first communication comprises the encrypted converted command.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Software Architecture

Figure 11:
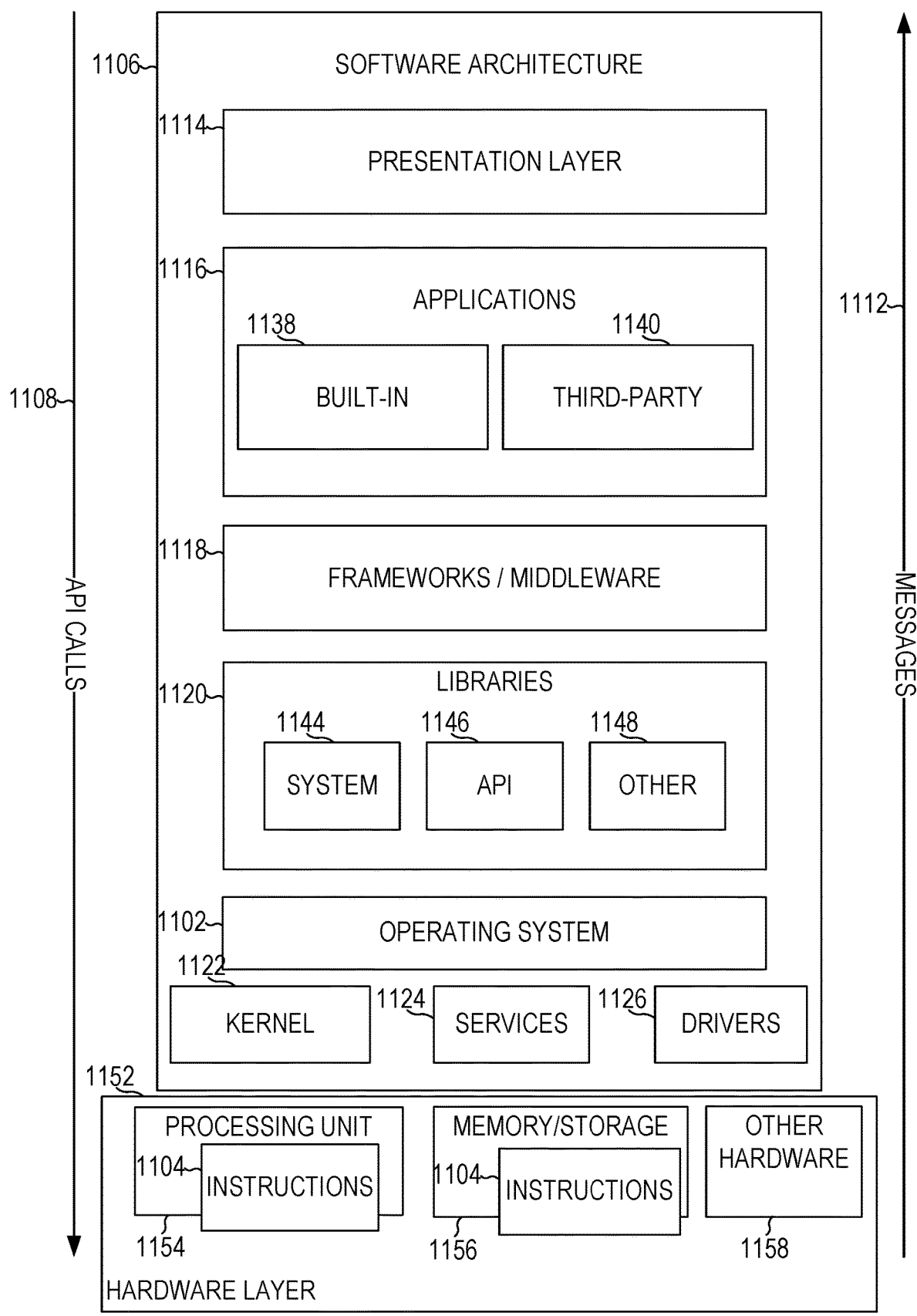
FIG. 11 is a block diagram illustrating an example software architecture, which may be used in conjunction with various hardware architectures herein described.

FIG. 11 is a block diagram illustrating an example software architecture 1106, which may be used in conjunction with various hardware architectures herein described. FIG. 11 is a non-limiting example of a software architecture 1106 and it will be appreciated that many other architectures may be implemented to facilitate the functionality described herein. The software architecture 1106 may execute on hardware such as machine 1200 of FIG. 12 that includes, among other things, processors 1210, memory 1230, and (input/output) I/O components 1250. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components, and so forth described herein. The hardware layer 1152 also includes memory and/or storage modules 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive a response such as messages 1112 in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphical user interface (GUI) functions, high-level resource management, high-level location services, and so forth. The frameworks/middleware 1118 may provide a broad spectrum of other APIs that may be used by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124, and/or drivers 1126), libraries 1120, and frameworks/middleware 1118 to create UIs to interact with users of the system. Alternatively, or additionally, in some systems, interactions with a user may occur through a presentation layer, such as presentation layer 1114. In these systems, the application/component "logic" can be separated from the aspects of the application/component that interact with a user.

Figure 12:
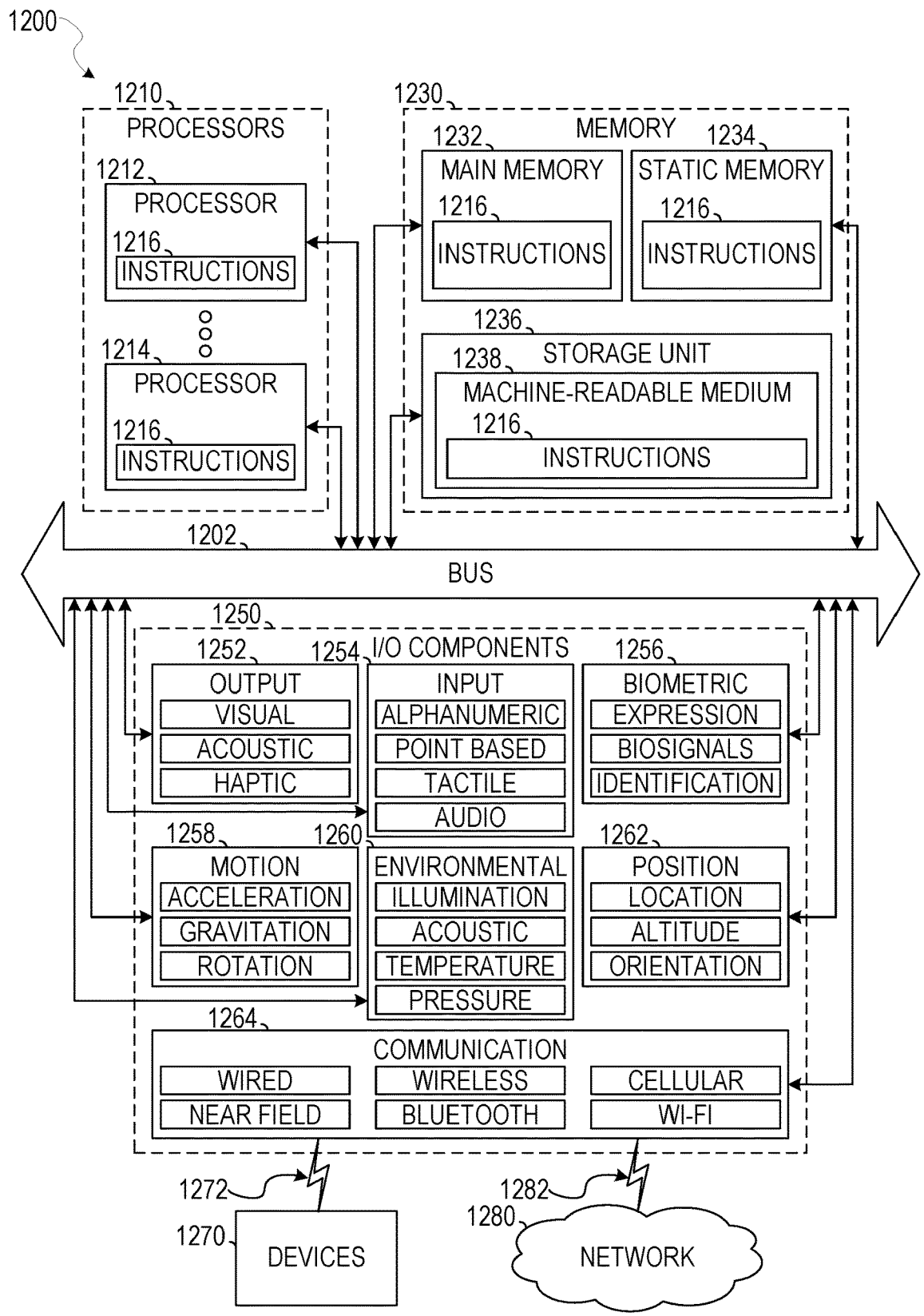
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other via a bus 1202. In an example embodiment, the processors 1210 (e.g., a CPU, a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (also referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236 accessible to the processors 1210 via the bus 1202. The storage unit 1236 may include a machine-readable medium 1238 on which are stored the instructions 1216 embodying any one or more of the methodologies or functions described herein. The instructions 1216 may also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various implementations, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, the communication components 1264 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, in some implementations, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1264, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WiFi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 as "non-transitory" should not be construed to mean that the medium is incapable of movement; the medium should be considered as being transportable from one physical location to another. Additionally, since the machine-readable medium 1238 is tangible, the medium may be considered to be a machine-readable device.

Glossary

"CARRIER SIGNAL" in this context refers to any intangible medium that is capable of storing, encoding, or carrying instructions 1216 for execution by the machine 1200, and includes digital or analog communications signals or other intangible medium to facilitate communication of such instructions 1216. Instructions 1216 may be transmitted or received over the network 1280 using a transmission medium via a network interface device and using any one of a number of well-known transfer protocols.

"CLIENT DEVICE" in this context refers to any machine 1200 that interfaces to a communications network 1280 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, IoT devices, or any other communication device that a user may use to access a network 1280.

"COMMUNICATIONS NETWORK" in this context refers to one or more portions of a network 1280 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1280 or a portion of a network 1280 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions 1216 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions 1216 (e.g., code) for execution by a machine 1200, such that the instructions 1216, when executed by one or more processors 1210 of the machine 1200, cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner.

In various example embodiments, one or more computer systems (e.g., a standalone computer system, a client computer system, or a server computer system) or one or more hardware components of a computer system (e.g., a processor or a group of processors 1210) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1210 or other programmable processor 1210. Once configured by such software, hardware components become specific machines 1200 (or specific components of a machine 1200) uniquely tailored to perform the configured functions and are no longer general-purpose processors 1210.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1210 configured by software to become a special-purpose processor, the general-purpose processor 1210 may be configured as respectively different special-purpose processors (e.g., comprising different hardware components) at different times. Software accordingly configures a particular processor or processors 1210, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1202) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices and can operate on a resource (e.g., a collection of information).

The various operations of example methods described herein may be performed, at least partially, by one or more processors 1210 that are temporarily configured (e.g., by software) or permanently configured to perform the relevant operations. Whether temporarily or permanently configured, such processors 1210 may constitute processor-implemented components that operate to perform one or more operations or functions described herein. As used herein, "processor-implemented component" refers to a hardware component implemented using one or more processors 1210. Similarly, the methods described herein may be at least partially processor-implemented, with a particular processor or processors 1210 being an example of hardware.

For example, at least some of the operations of a method may be performed by one or more processors 1210 or processor-implemented components. Moreover, the one or more processors 1210 may also operate to support performance of the relevant operations in a "cloud computing" environment or as a "software as a service" (SaaS). For example, at least some of the operations may be performed by a group of computers (as examples of machines 1200 including processors 1210), with these operations being accessible via a network 1280 (e.g., the Internet) and via one or more appropriate interfaces (e.g., an API). The performance of certain of the operations may be distributed among the processors 1210, not only residing within a single machine 1200, but deployed across a number of machines 1200. In some example embodiments, the processors 1210 or processor-implemented components may be located in a single geographic location (e.g., within a home environment, an office environment, or a server farm). In other example embodiments, the processors 1210 or processor-implemented components may be distributed across a number of geographic locations.

"PROCESSOR" in this context refers to any circuit or virtual circuit (a physical circuit emulated by logic executing on an actual processor 1210) that manipulates data values according to control signals (e.g., "commands," "op codes," "machine code," etc.) and which produces corresponding output signals that are applied to operate a machine 1200. A processor 1210 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1210 may further be a multi-core processor having two or more independent processors 1210 (sometimes referred to as "cores") that may execute instructions 1216 contemporaneously.

What is claimed is:

1. A method comprising:
    receiving, via a first network, a first communication from a first device, the first communication encrypted using point-to-point encryption and comprising a payload encrypted using end-to-end encryption;
    decrypting the first communication using a first point-to-point encryption key;
    based on the decrypted first communication, determining a second device;
    encrypting a second communication using a second point-to-point encryption key, the second communication comprising the payload encrypted using end-to-end encryption;
    transmitting, via a second network, the second communication to the second device; and
    multiplexing, on a single connection to the second device, multiple data streams comprising a first data stream for communication by an application and a second data stream for debugging the application.

2. The method of claim 1, wherein the payload comprises a debug command for the second device.

3. The method of claim 1, further comprising:
    receiving, by the first device, a command from a debugging application using a first protocol;
    converting, by the first device, the command to a second protocol; and
    encrypting, by the first device, the converted command using an end-to-end encryption key;
    wherein the payload of the first communication comprises the encrypted converted command.

4. The method of claim 1, further comprising:
    decrypting, by the second device, the payload using an end-to-end decryption key; and
    based on the decrypted payload, performing a debugging operation on the application running on the second device.

5. The method of claim 4, wherein the debugging operation comprises setting a breakpoint.

6. The method of claim 1, further comprising:
    receiving an incoming communication from the second device, the incoming communication comprising an identifier of the second device;
    determining, based on the identifier of the second device, an account associated with the second device; and
    allowing the first device to communicate with the second device based on the account.

7. The method of claim 6, wherein:
    the incoming communication is a first incoming communication;
    the identifier of the second device is a first identifier; and
    the method further comprises:
        receiving a second incoming communication from a third device, the second incoming communication comprising a second identifier of the third device;
        determining, based on the second identifier, that the account is associated with the third device; and
        causing to be presented a user interface that allows selection of either the second device or the third device for debugging.

8. A system comprising:
    one or more computer processors; and
    one or more computer-readable mediums storing instructions that, when executed by the one or more computer processors, cause the system to perform operations comprising:
        receiving, via a first network, a first communication from a first device, the first communication encrypted using point-to-point encryption and comprising a payload encrypted using end-to-end encryption;
        decrypting the first communication using a first point-to-point encryption key;
        based on the decrypted first communication, determining a second device;
        encrypting a second communication using a second point-to-point encryption key, the second communication comprising the payload encrypted using end-to-end encryption;
        transmitting, via a second network, the second communication to the second device; and
        multiplexing, on a single connection to the second device, multiple data streams comprising a first data stream for communication by an application and a second data stream for debugging the application.

9. The system of claim 8, wherein the payload comprises a debug command for the second device.

10. The system of claim 8, wherein the operations further comprise:
    receiving, by the first device, a command from a debugging application using a first protocol;
    converting, by the first device, the command to a second protocol; and
    encrypting, by the first device, the converted command using an end-to-end encryption key;

wherein the payload of the first communication comprises the encrypted converted command.

11. The system of claim 8, wherein the operations further comprise:
   decrypting, by the second device, the payload using an end-to-end decryption key; and
   based on the decrypted payload, performing a debugging operation on the application running on the second device.

12. The system of claim 11, wherein the debugging operation comprises setting a breakpoint.

13. The system of claim 8, wherein the operations further comprise:
   receiving an incoming communication from the second device, the incoming communication comprising an identifier of the second device;
   determining, based on the identifier of the second device, an account associated with the second device; and
   allowing the first device to communicate with the second device based on the account.

14. The system of claim 13, wherein:
   the incoming communication is a first incoming communication;
   the identifier of the second device is a first identifier; and
   the operations further comprise:
      receiving a second incoming communication from a third device, the second incoming communication comprising a second identifier of the third device;
      determining, based on the second identifier, that the account is associated with the third device; and
      causing to be presented a user interface that allows selection of either the second device or the third device for debugging.

15. A non-transitory computer-readable medium storing instructions that, when executed by one or more computer processors of one or more computing devices, cause the one or more computing devices to perform operations comprising:
   receiving, via a first network, a first communication from a first device, the first communication encrypted using point-to-point encryption and comprising a payload encrypted using end-to-end encryption;
   decrypting the first communication using a first point-to-point encryption key;
   based on the decrypted first communication, determining a second device;
   encrypting a second communication using a second point-to-point encryption key, the second communication comprising the payload encrypted using end-to-end encryption;
   transmitting, via a second network, the second communication to the second device; and
   multiplexing, on a single connection to the second device, multiple data streams comprising a first data stream for communication by an application and a second data stream for debugging the application.

16. The non-transitory computer-readable medium of claim 15, wherein the payload comprises a debug command for the second device.

17. The non-transitory computer-readable medium of claim 15, wherein the operations further comprise:
   receiving, by the first device, a command from a debugging application using a first protocol;
   converting, by the first device, the command to a second protocol; and
   encrypting, by the first device, the converted command using an end-to-end encryption key;
   wherein the payload of the first communication comprises the encrypted converted command.

18. The non-transitory computer-readable medium of claim 15, wherein the operations further comprise:
   decrypting, by the second device, the payload using an end-to-end decryption key; and
   based on the decrypted payload, performing a debugging operation on the application running on the second device.

19. The non-transitory computer-readable medium of claim 18, wherein the debugging operation comprises setting a breakpoint.

20. The non-transitory computer-readable medium of claim 15, wherein the operations further comprise:
   receiving an incoming communication from the second device, the incoming communication comprising an identifier of the second device;
   determining, based on the identifier of the second device, an account associated with the second device; and
   allowing the first device to communicate with the second device based on the account.

* * * * *